United States Patent Office 3,364,288
Patented Jan. 16, 1968

3,364,288
FRESH WATER RECOVERY
Sidney Loeb, Los Angeles, Calif., assignor to The Regents of the University of California
No Drawing. Filed May 25, 1962, Ser. No. 197,609
The portion of the term of the patent subsequent to May 12, 1981, has been disclaimed
8 Claims. (Cl. 264—49)

In general, the present invention relates to a method of preparing a semipermeable membrane adapted to permit substantially selective diffusion therethrough of a solution. More particularly the present invention relates to a membrane adapted to recover fresh water from a salt solution, such as sea water. The method of the present invention is a method incorporating improvements over the methods disclosed in applicant's co-pending applications, specifically, "High Flow Porous Membranes for Separating Water from Saline Solutions," Ser. No. 72,439, filed Nov. 29, 1960, now Patent No. 3,133,132, by Sidney Loeb and Srinivasa Sourirajan; "High Flow Porous Membranes for Separating Water from Saline Solutions," Ser. No. 181,013, filed Mar. 20, 1962, now Patent No. 3,133,-137, by Sidney Loeb, Srinivasa Sourirajan, and Dallas E. Weaver; and "Improvement of Desalinization Properties of High Flow Porous Membranes by Pressure Treatment Using Aluminum Ion," Ser. No. 196,337 filed May 21, 1962 by Sidney Loeb and Gargeswari R. Nagaraj, now Patent No. 3,170,867.

A problem which is presently facing people in the United States and other countries of the world is the problem of securing an adequate supply of fresh water. Particularly in the United States, the tremendous growth in population, coupled with the increased amounts of water used by each person, has already brought about potential water shortages in various areas in the United States, such as southern California. One solution to the fresh water supply problem has been to move fresh water from areas where there is a surplus to the areas where there is a shortage. For example, in the State of California has recently embarked on the construction of a huge aqueduct system costing several billion dollars to move surplus fresh water from northern California to southern California. Obviously, however, such solution to the fresh water supply problem is limited to the fresh water surplus in available adjacent areas, even where one is willing to spend large amounts of money to transport it. Thus, in the case of California, even with the completion of construction of the aqueduct system, the available fresh water supply is estimated to be only adequate for the next twenty years in view of the tremendous population growth of the southern California area.

For these reasons, which apply not only to California but also to many other states in the United States, the Federal Government has embarked on an extensive research program to solve the problem of recovering fresh water economically from saline water, such as sea water or the brackish sub-soil water bodies. Such research program has evolved many methods for recovering fresh water from sea water; however, no recovery method has yet been made sufficiently economical. Most methods of fresh water recovery from saline solutions involve the transfer of heat under thermodynamically irreversible conditions so that the process as a whole is unavoidably inefficient. In addition, in order to obtain the high rate of heat flow necessarily required, the saline solutions are normally handled at relatively high temperatures which results in severe corrosion and scale problems. Also, the heat transfer approach normally requires a large number of stages in series to increase heat economy so that a large amount of equipment and much operational maintenance is required.

The membrane produced by the method of the present invention may be utilized in a simple, thermodynamically reversible process to simply produce potable water (less than 500 parts per million dissolved solids) from a sea water brine containing solids in considerably greater concentration than is found in sea water in a single step. As described in the aforementioned co-pending applications, when salt water is pushed against a membrane, such as the one produced by the methods described in the present application, under a hydraulic pressure at least equal to the osmotic pressure of the salt solution (approximately 350 p.s.i. for a fresh water-sea water interface), a reverse osmosis appears to occur and fresh water flows through the membrane from the saline water side. However, the production of membranes useful in such simplified process for the recovery of fresh water has to date been hampered by the special treating steps required and the limited range of materials which have been found to be useful in such production. Also, the earlier membrane had a problem of obtaining a sufficient flow rate of fresh water therethrough with a sufficient reduction in the salt concentration.

Consequently, an object of the present invention is a method of producing membranes for a reverse osmosis process from a wider range of materials and with fewer and simpler treating steps.

Another object of the present invention is a method of producing an improved membrane which results in an increase in the production rate of fresh water therethrough per unit area with the fresh water salt content being decreased.

Other objects and advantages of the present invention will be readily apparent from the following description and examples which illustrate exemplary embodiments of the present invention.

In general, the present invention involves a method of preparing a semipermeable membrane adapted to permit substantially selective diffusion therethrough of a component of a solution. The method of the present invention involves, first, dissolving in an organic solvent a member selected from the group consisting of ether and ester cellulosic derivatives having the formula

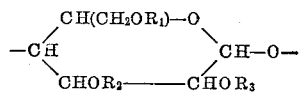

wherein $R_1$, $R_2$ and $R_3$ are members of a group consisting of H, $R_4$, and $CR_5O$, $R_4$ is an alkyl group containing 1 to 8 carbon atoms and $R_5$ is an alkyl group containing 1 to 7 carbon atoms. Also dissolved in such organic solvent is an aqueous solution of a pore-producing inorganic salt having a monovalent anion which may comprise a single central atom about which is grouped four atoms with the four atoms being identical and different from the central atoms. In addition, preferably, a pore-regulating inorganic salt is dissolved in the organic solvent which has an anion from the class consisting of halides and oxygenated halides. Such solution is then cast to form a membrane of substantially uniform thickness and a portion of the organic solvent is then evaporated for a predetermined period of time. The cast membrane may be then immersed in water and heated or simply immersed in a solution of a treating inorganic salt. It should be noted that the terms "porosity" and "permeable" as used in the present application refer only to the fact that the membrane has a structure which allows the selective flow therethrough of an appreciable rate of fresh water under suitable conditions.

The film forming material utilized in the method of the present invention is a cellulosic ether or ester derivative having the formula

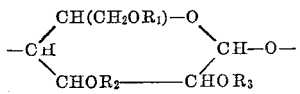

wherein $R_1$, $R_2$ and $R_3$ are members of a group consisting of H, $R_4$, and $CR_5O$, $R_4$ is an alkyl group containing 1 to 8 carbon atoms and $R_5$ is an alkyl group containing 1 to 7 carbon atoms. Specific examples of such cellulosic derivatives are cellulose acetate, cellulose acetate-butyrate, cellulose propionate and ethyl cellulose. Typical results from using the aforementioned cellulosic derivatives in the method of reverse osmosis and of the present invention are set forth below in Table I. The data of Table I was obtained utilizing first a standard casting solution composed of cellulose acetate, acetone, and a 10% by weight aqueous solution of magnesium perchlorate. Then each of the other cellulosic derivatives was used in place of cellulose acetate. The weight ratio of acetone to the cellulosic derivative was about 3/1 and the weight ratio of the magnesium perchlorate solution to the cellulosic derivative was about 1/2, so that the composition of the casting solution was 22.2% cellulosic derivative, 66.7% acetone, 10% water, and 1.1% magnesium perchlorate. The solution was then cast at a temperature of about −8° to −11° C. onto a cold glass plate which had 0.010 inch thick side runners to give this thickness to the as-cast film. The film was cast by passing an inclined knife, the back wall of which forms an integral frame containing an excess of the casting solution across the glass plate with the knife resting on the side runners only. The acetone was then allowed to evaporate from the membrane while in the cold box for about three to four minutes after which the film and plate were immersed in ice water for at least an hour. The film was then removed from the glass plate and heated in hot water for about fifteen minutes at 79° to 82° C. After heating, the membrane was ready for use by utilizing the side of the membrane which was away from the glass during casting toward the brine solution from which fresh water is to be recovered. A feel brine of 5¼% sodium chloride in tap water was then applied to the membrane under a final pressure of 1500 p.s.i.g. Such pressure was achieved in steps with a pressure of 1000 p.s.i.g. applied first for about fifteen minutes. The production rate of fresh water and the salt content of the fresh water so produced were then measured. The aforementioned procedure is considered the standard procedure for testing the effectiveness of the membrane.

TABLE I

| Film Matrix | Production Rate (gal./ft.² day) | Product Salt Content (wt. percent) |
|---|---|---|
| Cellulose acetate | 7.4 | 0.05 |
| Ethyl cellulose | 0.2 | 2.45 |
| Cellulose acetate butyrate | 1.4 | 1.85 |
| Cellulose propionate | 1.2 | 0.41 |

It should be noted that the cellulose acetate utilized to form the membrane may be a standard commercial product, i.e., cellulose acetate E-398-3 produced by Eastman Chemical Products, Inc., of Kingsport, Tenn. Such cellulose acetate has a hydroxyl content of approximately 3.4 weight percent. It has been found that when the hydroxyl content of the cellulose acetate is increased to about 5.1%, that the salt content of the product water is approximately doubled, and that the product rate is reduced to about one-third. Also it should be noted that the cellulose acetate-butyrate utilized had about a 16% butyryl content. Finally, it should be noted that in the case of ethyl cellulose, the final heating step has the unusual effect of decreasing the effectivenes of the resulting membrane so it is preferred not to use such step with ethyl cellulose.

In addition to the film matrix cellulosic derivative, an aqueous solution of an inorganic salt having a monovalent anion is utilized as a pore-forming material. The pore-producing salt may comprise an inorganic salt having a monovalent anion which has a single central atom about which is grouped four atoms with the four atoms being identical and different from the central atom. Such anions include perchlorate, periodate, permanganate, perrhenate, and fluoborate, with perchlorate generally being preferred because it yields unexpectedly good membranes. It should be noted that most of the central atoms of the aforementioned group have the additional common characteristic of being in column VII or VII-A of the Periodic Table. In addition to the aforementioned anions, it has been found that thiocyanate and fluoride may also be utilized as the anion in the pore-forming salt. In Table II below, typical data is set forth utilizing the aforementioned pore-producing salts and employing standard casting solution and standard procedure set forth above except for the change in the identity of the pore-producing salt.

TABLE II

| Anion Group | Compound Added | Production Rate (gal./ft.² day) | Product Salt Content (wt. percent) |
|---|---|---|---|
| ClO₄⁻ | Mg(ClO₄)₂ | 10 | 0.07 |
| IO₄⁻ | NaIO₄ | 12 | 0.15 |
| MnO₄⁻ | KMnO₄ | 11 | 0.09 |
| ReO₄⁻ | NaReO₄ | 7 | 0.10 |
| NCS⁻ | NaBF₄ | 11 | 0.14 |
| NCS⁻ | NaBF₄ | 15 | 0.13 |

The concentration of the pore-producing salt in its aqueous solution may range from about 5% by weight to a saturated solution; however, a weight percent of 10–20% is preferred, especially in the case of magnesium perchlorate.

It should be noted that although the cation portion of the pore-producing salt has some influence on the resulting membrane characteristics, such influence is relatively small compared to the influence of the anion portion of the pore-producing salt. As set forth in Table III below, various cations were utilized in combination with perchlorate as the anion and while employing the same standard casting solution and procedure set forth above.

TABLE III

| Cation Group | Production Rate (gal./ft.² day) | Product Salt Content (wt. percent) |
|---|---|---|
| Lithium | 9.9 | 0.11 |
| Hydrogen (perchloric acid) | 6.9 | 0.07 |
| Sodium | 8.5 | 0.07 |
| Ammonium | 12.6 | 0.13 |
| Magnesium | 8.2 | 0.05 |
| Aluminum | 7.6 | 0.06 |

The film forming cellulosic derivative and pore-producing salt are dissolved in an organic solvent which is miscible with water and dissolves the pore-producing salt. Such organic solvent provides a casting solution of desired viscosity so that the solutions are not too viscous to prevent casting of uniform film, but sufficiently viscous to prevent the film produced becoming jelly-like upon immersion in water. Typical organic solvents which have been found useful in the present invention are acetone, methyl ethyl ketone, ethyl alcohol, methyl alcohol, and mixtures of one or more of such solvents. However, it should be noted that acetone has been found to give unexpectedly good results with respect to the resulting membrane characteristics. The weight ratio of the organic solvent to the cellulosic derivative is normally in the range of about 2/1 to 4/1 with the ratio of 3/1 being preferred, especially for the combination of acetone and cellulose acetate. The weight ratio of the aqueous pore-producing salt solution to the cellulosic derivative is between about 1/1 and 1/3, with the ratio of 1/2 being preferred, especially with the combination of magnesium perchlorate and cellulose acetate.

The production rate of the resulting membrane may be increased by the addition of a pore-regulating inorganic salt to the casting solution and which dissolves therein. Such pore-regulating salt usually will not alone result in an appreciable production rate through the membrane; however, it does have the surprising and unexpected result of increasing the production rate through the membrane in combination with the pore-producing salt. Such pore-regulating salt usually has an anion from the class consisting of halides and oxygenated halides. Specific pore-regulating salts which have been found useful in the present invention include sodium chloride, sodium bromide, sodium iodide, sodium chlorate, hydrochloric acid, magnesium chloride, lithium chloride, and aluminum chloride; however, the use of sodium chloride has been found to be unusually and unexpectedly beneficial and both increases the production rate and reduces the product salt content. The weight ratio of the pore-producing salt to the pore-regulating salt should be in the range of about 10/1 to 1/1 with the ratio of about 10/3 being preferred, especially in the combination of magnesium perchlorate with sodium chloride. In Table IV, the data for the addition of these various salts is set forth utilizing the standard casting solution and procedure set forth above. A set of data for a membrane formed by adding solely a pore-producing salt, i.e. magnesium perchlorate is included for purposes of comparison.

TABLE IV

| Pore-Producing Salt | Pore-Regulating Salt | Weight Ratio of Pore-Producing Salt to Regulating Salt | Production Rate (gal./ft.² day) | Product Salt Content (Wt. percent) |
|---|---|---|---|---|
| $Mg(ClO_4)_2$ | | | 9.3 | 0.08 |
| $Mg(ClO_4)_2$ | NaCl | 10/3 | 11.6 | 0.06 |
| $Mg(ClO_4)_2$ | NaBr | 1/1 | 12.6 | 0.08 |
| $Mg(ClO_4)_2$ | NaI | 1/2 | 10.1 | 0.07 |
| $Mg(ClO_4)_2$ | $NaClO_3$ | 10/5 | 12.9 | 0.14 |
| $Mg(ClO_4)_2$ | HCl | 10/3 | 15.6 | 0.08 |
| $Mg(ClO_4)_2$ | $MgCl_2$ | 10/4 | 11.8 | 0.09 |
| $Mg(ClO_4)_2$ | LiCl | 10/3 | 13.2 | 0.15 |
| $NH_4ClO_4$ | NaCl | 10/1 | 11.0 | 0.08 |
| $NaClO_4$ | NaCl | 10/1 | 14.8 | 0.15 |
| $Al(ClO_4)_3$ | NaCl | 10/3 | 11.0 | 0.08 |
| $Al(ClO_4)_3$ | $AlCl_3$ | 10/4 | 12.9 | 0.10 |
| $HClO_4$ | HCl | 10/3 | 12.6 | 0.11 |

It should be noted that similarly to the pore-producing salt, the cation portion of the pore-regulating salt has some influence on the characteristics of the resulting membrane. However, such influence is relatively small compared to the influence of the anion portion.

After the casting solution has been prepared, it may be cast to form a membrane of substantially uniform thickness. For example, in the standard method of membrane preparation, the casting solution is poured onto a cold glass plate which has 0.010 inch side runners to give this thickness to the as-cast film. The film is then cast by passing an inclined knife across the glass plate which rests on the side runners. The back wall of the knife forms an integral frame containing an excess of casting solution. The inclined knife is preferably pulled across the plate at a predetermined slow rate. For example, when the length of the plate is about 8 inches the traverse of the knife required is normally accomplished in the range of about 0.13 to 0.25 minutes without substantially affecting the results. Too slow a period of time permits excessive evaporation. Too fast a traverse time results in an imperfect surface formation or even rupture of the film.

A major portion of the organic solvent then evaporates. Such time period has been found to depend upon the thickness of the cast membrane for obtaining a membrane with the optimum desired characteristics, i.e. high production rate and low product salt content. When the organic solvent utilized is acetone, the period of time during which said solvent is evaporated may be determined by having the ratio of the thickness of the cast membrane in inches to the time period minutes be in the range of about 0.001 to 0.015 when the casting and evaporating are done at a temperature in the range of about −16° C. to −7° C. For example, as set forth below in Table V, the optimum time range for a membrane as-cast thickness of 0.010 inch is two to four minutes. In Table V, the data was obtained following the standard procedure set forth above and represent the evaporation time range found to produce the best production rate and lowest product salt content for the thicknesses of the as-cast membrane as specified.

TABLE V

| As-cast Membrane Thickness | Evaporation time for optimum membrane characteristics (min.) |
|---|---|
| 0.010 | 2–4 |
| 0.15 | 3–5 |
| 0.025 | 8–10 |

The cast membrane may then be first immersed in water at about 0° C. and then heated in hot water for about fifteen minutes in the range of 79° to 80° C. Alternatively, the heating step may involve immersing in water at about 50° C. and then heating up to about 80° C. over a period of about one-half hour. Such combination of immersion in ice water and heating in hot water removes the inorganic salts from the cast membrane and reduces its porosity so that a low salt content product may be achieved.

However, in accordance with the present invention, the cast membrane may be treated by immersing it in a cold solution of an inorganic treating salt. Among other possible effects such treatment has been found to remove the inorganic salts in the membrane and reduce the porosity of the membrane. The treating salt solution is preferably below about 0° C., with a preferred temperature being about a −5° C. The treating salt may be of any of the salts utilized as a pore-regulating salt and, in fact, the treating salt may be the same salt as utilized for pore regulation. However, it is preferred that sodium chloride be utilized in the treating salt solution. In Table VI below, the effect of the replacement of the water immersion and heating steps by the immersion in the treating salt solution is compared showing the marked effect of the treating salt solution. When sodium chloride is used in the treating salt solution, it is preferred that it have a concentration in the range of about 5% to 25% by weight.

TABLE VI

| | Film Matrix | Production Rate (gal./ft.² day) | Product Salt Content (Wt. percent) |
|---|---|---|---|
| Standard Procedure | Cellulose Acetate-Butyrate | 1.4 | 1.85 |
| Treating Salt Procedure [1] | do | 2 | 0.01 |
| Do [2] | do | 4 | 0.01 |

[1] In place of immersing a membrane prepared by the standard procedure in water and then heating, it was immersed in 15% NaCl solution at −5° C. Butyryl content was about 17%.
[2] Same as [1] except standard membrane preparation procedure was varied by using a 1/1 ratio of a 50% magnesium perchlorate solution and a one-half minute period between casting and immersion. Also 15% NaCl solution was maintained at 10° C.

By utilizing the standard casting solution and procedure set forth above in the present invention, i.e. casting a film having an as-cast thickness of 0.010 inch a finished membrane may be achieved having a thickness on the order of 0.005 inch. However, if the standard casting procedure is varied by utilizing a casting solution containing only 5% cellulose instead of the usual 22.2%, a membrane having a thickness less than about 0.0010 inch as cast may be obtained. For example, a membrane having a thickness of only 0.0005 inch has been obtained by this procedure. Such film may be used directly after its water immersion without heating. A trial run on such film gave a production rate of 9.1 gallons per foot squared day and a product salt content of 0.6%. However, such extremely thin membranes have to date been found useful only in the laboratory because of the difficult handling problems connected therewith.

One of the features of the present invention is that it utilizes a relatively wide range of cellulosic derivatives to form the membrane produced by the present invention. Also a wide range of pore-producing salts may be utilized to produce such membrane. Another feature of the present invention is the addition of a pore-regulating salt to the membrane casting solution to improve the productivity of the resulting membrane and to reduce the salt content of the fresh water produced. Still another feature of the present invention is the eliminating of the heat treatment of cast membranes by dipping them into treating salt solutions. Also extremely thin membranes have been produced which show significant productivity and reduction in salt content.

It will be understood that the foregoing description and examples are only illustrative of the present invention and it is not intended that the invention be limited thereto. Many other specific embodiments of the present invention will be obvious to one skilled in the art in view of this disclosure. All substitutions, alterations, and modifications of the present invention which come within the scope of the following claims or to which the present invention is readily susceptible without departing from the spirit and scope of this disclosure are considered part of the present invention.

I claim:
1. A method of preparing a semipermeable membrane adapted to permit substantially selective diffusion therethrough of a component of a solution comprising:
  (a) dissolving
    (I) a member selected from the group consisting of ether and ester cellulosic derivatives having the formula

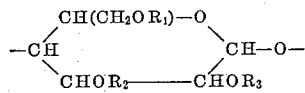

wherein $R_1$, $R_2$ and $R_3$ are members of a group consisting of H, $R_4$ and $CR_5O$, wherein $R_4$ is an alkyl group containing 1 to 8 carbon atoms and $R_5$ is an alkyl group containing 1 to 7 carbon atoms, and
    (II) an aqueous solution of a pore-producing inorganic salt having a monovalent anion from the class consisting of periodate, permanganate, perrhenate, fluoborate, thiocyanate and fluoride and a pore-regulating inorganic salt different from said pore-producing salt and having an anion selected from the class consisting of halides and peroxygenated halides,
in an organic solvent:
  (b) casting said solution to form a membrane;
  (c) evaporating a major portion of said organic solvent;
  (d) immersing the cast membrane in water to remove said inorganic salt; and
  (e) heating the cast membrane.

2. A method as stated in claim 1 wherein said pore-regulating salt is sodium chloride.

3. A method of preparing a semipermeable membrane adapted to permit substantially selective diffusion therethrough of a component of a solution comprising:
  (a) dissolving:
    (I) a member selected from the group consisting of ether and ester cellulosic derivatives having the formula

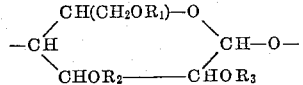

wherein $R_1$, $R_2$ and $R_3$ are members of a group consisting of H, $R_4$, and $CR_5O$, wherein R is an alkyl group containing 1 to 8 carbon atoms and $R_5$ is an alkyl group containing 1 to 7 carbon atoms; and
    (II) an aqueous solution of a pore-producing inorganic salt having a monovalent anion from the class consisting of periodate, permanganate, perrhenate, fluoborate, thiocyanate, and fluoride, in an organic solvent;
  (b) casting said solution to form a membrane;
  (c) evaporating a major portion of said organic solvent; and
  (d) removing said pore-producing salt from said membrane and improving the selective diffusion through said membrane by immersing the cast membrane in a previously prepared aqueous solution of an inorganic salt selected from the group consisting of halides and oxygenated halides.

4. The method as stated in claim 3, wherein the cast membrane is heated after said immersion.

5. A method as stated in claim 3, wherein the treating salt is sodium chloride at a weight concentration in the range of about 5% to 25%.

6. A method as stated in claim 3 wherein a pore-regulating inorganic salt is dissolved in said casting solution, said pore-regulating salt having an anion different from said pore-producing salt and selected from the class consisting of halides and oxygenated halides.

7. A method as stated in claim 6 wherein said pore-regulating salt is sodium chloride.

8. A method as stated in claim 3 wherein said organic solvent is acetone and said solution is cast and evaporated at a temperature in the range of about −16° C. to −7° C. and the period of time during which said solvent is evaporated is determined by having the ratio of the thickness of the cast membrane in inches to the time period in minutes being in the range of about 0.001 to 0.015 when casting and evaporating at a temperature in the range of about −16° C. to −7° C.

References Cited

UNITED STATES PATENTS

| | | | |
|---|---|---|---|
| 1,688,457 | 10/1928 | Eichengrün | 264—218 |
| 2,088,642 | 8/1937 | Dreyfus | 264—218 X |
| 2,317,131 | 4/1943 | Conaway | 264—217 |
| 2,329,983 | 9/1943 | Czapek | 106—122 |
| 2,418,211 | 4/1947 | Williams | 106—122 |
| 2,810,932 | 10/1957 | Honey et al. | |
| 2,829,944 | 4/1958 | Houtz et al. | |
| 2,926,104 | 2/1960 | Goetz | 18—57 XR |
| 3,026,571 | 3/1962 | Maier | 18—57 |
| 3,133,132 | 5/1964 | Loeb et al. | 264—49 |

ALEXANDER H. BRODMERKEL, *Primary Examiner.*

C. B. HAMBURG, A. L. LEAVITT, P. E. ANDERSON,
*Assistant Examiners.*